March 16, 1954 — A. G. BODINE, JR — 2,672,322
SONIC EARTH BORING DRILL
Filed Dec. 14, 1953 — 3 Sheets-Sheet 3
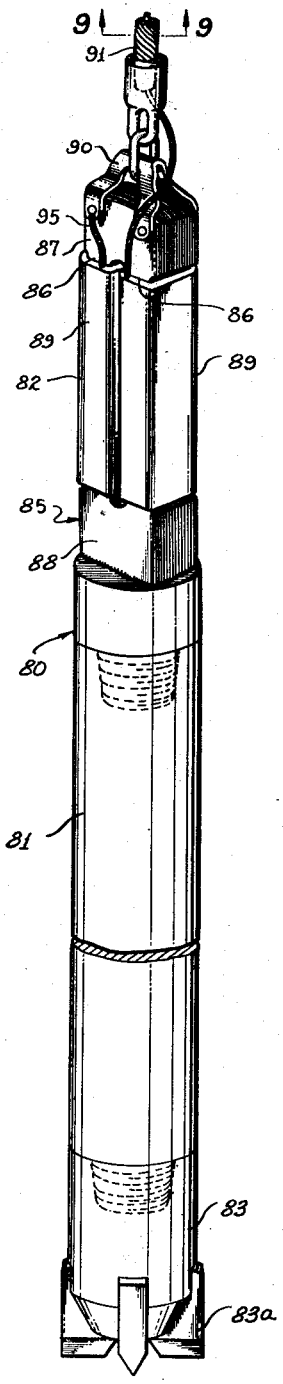
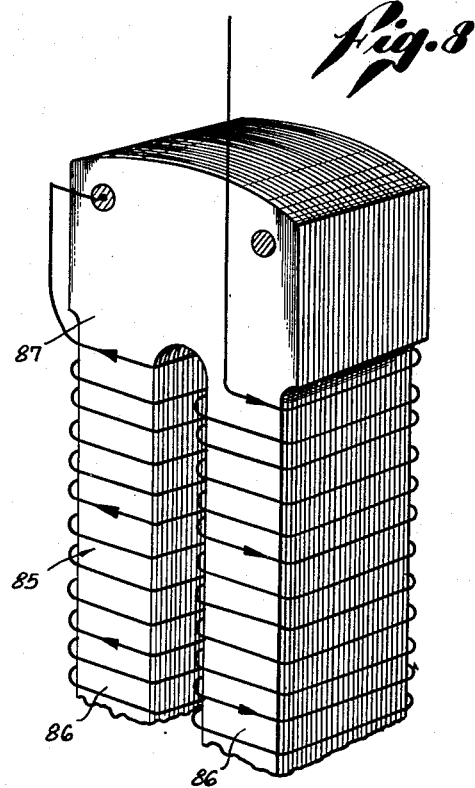
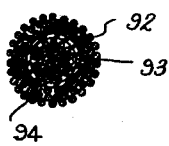
INVENTOR.
ALBERT G. BODINE JR
BY
Attorney Patented Mar. 16, 1954

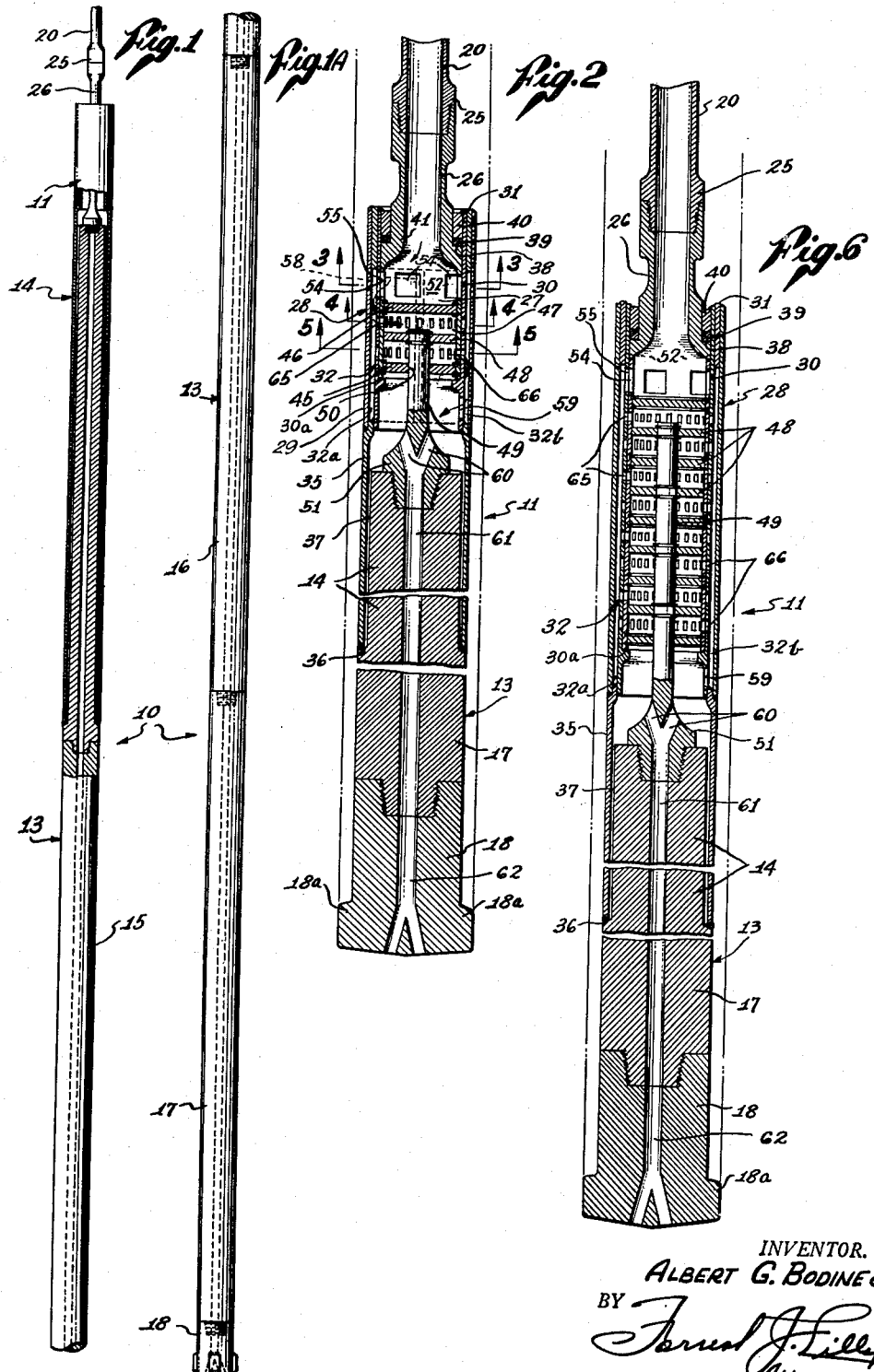

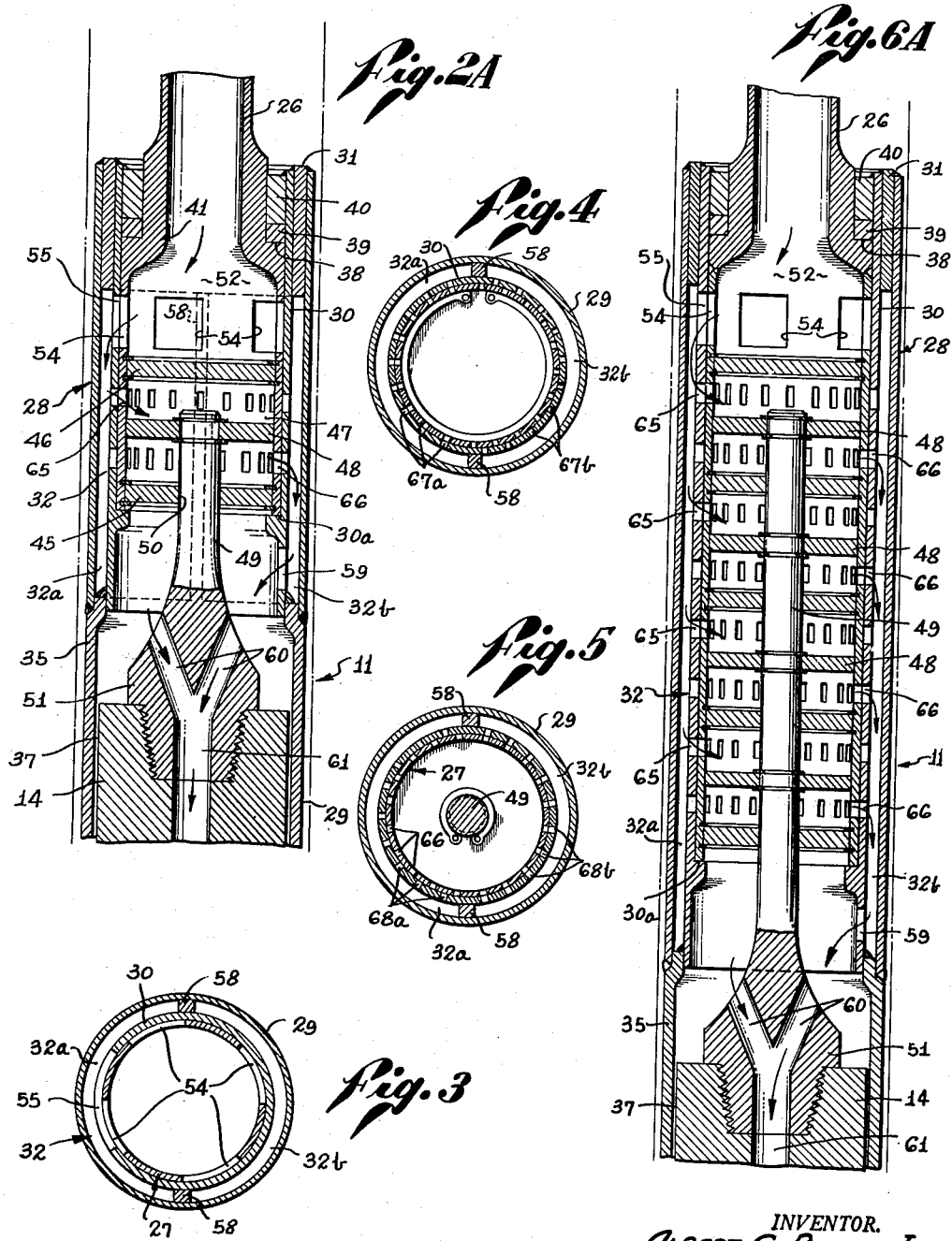

2,672,322

UNITED STATES PATENT OFFICE 2,672,322

SONIC EARTH BORING DRILL

Albert G. Bodine, Jr., Van Nuys, Calif.

Application December 14, 1953, Serial No. 397,904

6 Claims. (Cl. 255—4.4)

This invention relates generally to earth boring, and particularly to earth boring drills of the "sonic" type, such as disclosed in my copending application entitled Earth Boring Apparatus, filed December 11, 1950, Serial No. 200,277, now Patent No. 2,554,005, with which the present application is connected by co-pendency. Said application Serial No. 200,277 was a continuation-in-part of my original application entitled Earth Boring Tool, filed September 16, 1946, Serial No. 697,235, now abandoned, and the present application is a continuation-in-part of my application Serial No. 225,827, filed May 11, 1951, entitled Sonic Earth Boring Drill, which was a continuation-in-part of said original application Serial No. 200,277. The term sonic in connection with the class of drills here referred to does not necessarily refer to audible sound frequencies, but more directly refers to the fact that power is transmitted through the apparatus by elastic wave transmission which is of the nature of sound wave transmission in solid media.

Drills of the sonic type embody, generally speaking, three components: a bit, a relatively long elastic drill rod connected to the bit, and an elastic wave or vibration generator connected to the drill rod. The elastic vibration generator operates to apply a longitudinal vibrational force to the drill rod and thereby set up longitudinal elastic waves therein, and is operated at a frequency to resonate the rod, so that a standing wave is set up along the rod. This standing wave imparts a reciprocating action to bit cutters.

While several modes of resonance are feasible, the simplest here chosen for illustrative purposes, consists in half-wave vibration, according to which the vibration generator is operated at a frequency equal to approximately $S/2L$, or between $S/2L$ and $S/4L$, where L is the length of the drill rod and S is the speed of sound in said rod. In such operation, the elastic vibration generator applies cyclic longitudinal forces on the rod at the fundamental resonant frequency of the rod, and the rod is set into resonant elastic half-wave vibration. Both ends of the rod then vibrate oppositely, and an intermediate portion of the rod stands substantially stationary, velocity anti-nodes being found at the two ends, and a velocity node at the center. The bit on the lower end of the longitudinally elastically vibrating rod acts against the hole bottom, causing the formation to undergo an elastic vibration, and the formation gives way under the bit, apparently by elastic vibration fatigue failure. For a more complete discussion of such a sonic drill, see my aforesaid Patent No. 2,554,005 wherein I disclosed a form of sonic drill including a means for adjusting a low impedance motive power source to the high impedance characteristic of hard rock formation.

In my said prior application, I explained the concept of acoustic impedance (ratio of cyclic force to cyclic motion) in connection with sonic drills, and dealt with the problem presented by the fact that the high impedance characteristic of hard rock or firm earthen formation defies straightforward attempts to set it into the desired elastic vibration. Two concepts disclosed in said prior application are effective in dealing with this problem, the first involving a means for adjusting a low impedance power input toward the high impedance of the formation, and the second involving a drill rod in the form of an extra heavy drill collar, characterized by a cross-sectional area at least approximately that of a solid cylindrical rod whose diameter is one half the diameter of the bit circle. While the ideal solution contemplates the use of both these features in combination, either in and of itself constitutes a substantial improvement, and the second mentioned of the two is the subject matter of one aspect of the invention to which the present application is directed. The present application accordingly discloses such a drill collar embodied in two different sonic drills, one of which includes a means in connection with the vibration generator for bringing about an adjustment of a low impedance power source toward the high impedance characteristic of the formation, and the other of which has no such impedance adjustment means in connection with the vibration generator, but relies alone, for effective drilling, on the use of a drill collar of large cross-sectional area.

A general object of the invention is the provision of a sonic type drill having improved means for dealing with the high impedance problem encountered in earthen drilling, and a further and more particular object is the provision of an improved vibratory drill rod permitting and bringing about effective drilling of high impedance earthen formation by sonic drills, with or without attention to impedance adjustment features within or in connection with the elastic vibration generator.

The acoustic impedance of hard rock undergoing drilling is not far from that of a steel rod, such as the drill collar rod employed in my sonic drills. Employing a sonic drill, with the usual steel drill collar rod, the bit end of the rod during resonant operation does not present its highest possible impedance where needed at the bit, since it is impractical to have sufficient weight imposed on the rod to hold it down, and thereby maintain its nodal, or high impedance, point adjacent the bit. The resulting mismatch of impedance between the drill and the formation is sufficient to damp the drill and thereby prevent good power delivery to the formation. This means that the sharpness of tuning, and resonant amplification effect (acoustic Q), in a too slender rod is greatly reduced by damping action of the bit while drilling. Acoustic "Q" is the ratio of inertia to damping; and the internal damping of steel is very low compared to that of the bit action, so that adding steel increases the Q by increasing rod impedance and bit freedom. This permits greater vibratory motion so that lower output impedance generators can be used. It should be clear that the greater the weight of the drill collar rod per linear length, the higher will be its characteristic impedance, and I have found that a sufficient adjustment to earthen impedance for sonic drilling is obtained when the cross-sectional area of the rod is approximately half that of the bit circle, or greater. In such a case, the rod itself couples effectively to the formation while not damping out all of its resonant motion; and all that is further required is a vibration generator, with or without impedance adjustment features, for applying cyclic driving force to the rod at its resonant frequency. On the other hand, the drop off in rod impedance for sizes very much below the above-mentioned half-sized cross-section is so great that effective energy delivery to the rock is virtually impossible without using a very powerful vibration generator incorporating an impedance adjusting feature. That is to say, if I do not use a drill collar rod of sufficient cross-section to assure an impedance sufficiently high to compare favorably with that of the formation whereby the rod can continue vibrating actively so as to be an effective intermediate impedance link allowing sufficient stroke at the vibration generator, then I find that I must provide a very powerful vibration generator, incorporating an impedance adjustment feature, such for instance as disclosed in my aforesaid Patent No. 2,554,005.

Said application disclosed several impedance adjusting vibration generators, characterized by motor devices of high displacement rate, operated by motive power means in low impedance form capable of delivering power output to the resonant drill collar rod at high impedance when coupled to the formation. Some of these generators relied upon velocity reduction and correlative force gain to accomplish this end. Typically, as therein disclosed, a low impedance, high displacement rate fluid motor device included a power receiving member which traveled at relatively high velocity, and a velocity reduction, with corresponding force gain, was accomplished between said power receiving member and the point of driving connection with the drill collar rod. Broadly, as therein disclosed, assuming the case of a fluid driven vibration generator, the requirement is that there be a velocity reduction between a relatively high volume flow fluid stream and the elastic deformation stroke velocity of the driving connection of the vibration generator to the drill collar rod.

The present invention, in its second aspect, provides a new impedance adjusting vibration generator of a fluid driven type, wherein impedance adjustment is accomplished in a novel and simple manner, this impedance adjusted generator, in combination with the large cross-section drill collar, constituting a most effective impedance matched drilling system assuring maximized delivery of drilling energy to the formation. This impedance adjusted vibration generator, however, is of sufficient power, and sufficiently brings about an impedance match to the formation, even in the absence of the use of the large cross-section drill collar rod, as to assure coupling and sufficient power delivery to the formation for effective drilling.

A further object of the invention is accordingly the provision of a novel fluid driven impedance adjusted elastic vibration generator in a sonic drill.

The invention will be better understood from the following detailed description of certain present illustrative embodiments thereof, reference for this purpose being had to the accompanying drawings, in which:

Figs. 1 and 1a, taken together, show an elevational view, partly in section, of a sonic drill in accordance with the invention;

Fig. 2 is a longitudinal sectional view, to a larger scale, of the drill of Fig. 1, parts being broken away;

Fig. 2a is an enlargement of a portion of Fig. 2;

Fig. 3 is an enlarged section taken on line 3—3 of Fig. 2;

Fig. 4 is an enlarged section taken on line 4—4 of Fig. 2;

Fig. 5 is an enlarged section taken on line 5—5 of Fig. 2;

Fig. 6 is a view similar to Fig. 2 but showing the drill in a modified form with provision for impedance adjustment within the vibration generator; and Fig. 6a is an enlargement of a portion of Fig. 6;

Fig. 7 is a perspective view of another embodiment of my drill;

Fig. 8 is a perspective view of a portion of the magneto-striction core of the drill of Fig. 7; and Fig. 9 is a section on line 9—9 of Fig. 7.

In Figs. 1–5 of the drawings, the sonic drill of the invention is designated generally by the numeral 10, and is shown to consist of an elastic vibration generator 11, an elastic longitudinally vibratory rod 13, here shown to consist of a plurality of intercoupled steel drill collars 14, 15, 16, and 17, and to the lower end of the latter is coupled the bit 18.

Vibration generator 11 is suspended from a conventional drill pipe string 20 understood to be suspended from the ground surface from conventional rotary table equipment, not shown. As earlier stated, the rod 13 made up of the drill collars 14—17 is of substantial cross-sectional area, equal at least to that of a cylindrical rod whose diameter is equal to one-half the diameter of the "bit circle," or in other words, to the diameter of the circle defined by the blades 18a of the bit. Necessarily, of course, the collars must be of lesser diameter than the bit. The upper drill collar 14, in a present illustrative embodiment, is slightly reduced in diameter in relation to the other collars, but the average cross-sectional area of the collar assembly still meets the specification given.

In the embodiment of Figs. 2 to 4, drill pipe 20 is coupled at 25 to a tubular pipe or neck 26 extending upwardly from a hollow cylinder 27 rotatably mounted within the exterior body 28 of vibration generator 11. This body 28 consists of an exterior cylindrical casing 29, a sleeve 30 annularly spaced inside casing 29, and a spacer sleeve 31 at the top, between casing 29 and sleeve 30, said members all being welded together, as indicated, to form a unitary assembly. It will be seen that the structure as thus described provides an annular space 32 between casing 29 and sleeve 30 below the spacer 31. Casing 29 and sleeve 30 are joined at their lower ends to the upper end of a long steel pipe 35, being welded thereto, as illustrated, so as to close the annular space 32 at the bottom. This pipe 35 is of the same exterior diameter as the lower drill collars 15—17, and extends downwardly over the slightly reduced upper drill collar 14 nearly to the lower end of the latter, where it is integrally joined, as by welding, to a shoulder 36, at which point the diameter of collar 14 is increased to the diameter of the collars below. An annular space, as indicated at 37, is provided between the collar 14 and pipe 35, so as to avoid frictional rubbing of said members on one another during their longitudinally vibratory action.

The aforementioned cylinder 27 is rotatably fitted inside sleeve 30, being supported at the bottom by an annular, upwardly facing shoulder 30a near the lower end of sleeve 30. The cylinder 27 is formed at the top with an upwardly facing shoulder 38, on which is placed a bearing bushing 39, typically a fabric filled phenolic resin, above which is a steel ring 40 welded to the upper end of sleeve 30. The neck portion 26 of the generator joins the cylinder 27 by means of a cylindrical section 41 extending upwardly from shoulder 38, and this section 41 has a rotating fit inside the ring 39. It will be seen that the body 28 of the vibration generator, and the drill collars below, which are hung from body 28 by means of pipe 35 welded to the lower end portion of collar 14, are all suspended from cylinder 27, the load being transferred through ring 40 to the external upwardly facing shoulder 38 on the cylinder 27. In the operation of the apparatus, the drill string 20 is rotated, causing vibration generator cylinder 27 to turn inside generator body 28. The vibration generator body 28, drill collars below, and the bit, will be rotated also to some extent by the frictional drag of the rotating generator cylinder 27, but the frictional drag of the surrounding bore hole is sufficient that this rotation will be rather small as compared with the rotation of the drill string 20 and generator cylinder 27, which may be typically in the neighborhood of 180 R. P. M.

Generator cylinder 27 has a bottom wall 45, and an intermediate partition wall 46, and these two walls define a cylinder space 47 for a piston 48 mounted on the upper end of a connecting rod 49 which extends downwardly with a working fit through a bore 50 in bottom wall 45. The lower end of connecting rod 49 has a coupling 51 joined to the upper end of drill collar 14.

In the operation of the drilling system, the usual rotary mud fluid employed in conventional drilling is circulated down through pipe string 20 from usual mud pumps at the ground surface, the ground surface equipment all being conventional and hence requiring no description herein. This drilling fluid extends downwardly through neck 26 and into generator cylinder 27 to the space 52 above partition 46. It then flows outwardly through ports 54 in the upper portion of the wall of cylinder 27 and through a port 55 in one side of sleeve 30 to the upper end of the previously mentioned annular space 32. In the present design, there are four of the ports 54, equally spaced, and each of approximately 45° angular extent, and these register consecutively with port 55, which is of 90° angular extent. It will be seen that with this arrangement, flow from within the chamber 52 to the annular space 32 will be uninterrupted by the rotation cylinder 27 inside sleeve 30. The space generally designated by the reference numeral 32 is divided into two vertical fluid channels 32a and 32b by means of two vertical partitions 58 located between sleeve 30 and cylindrical case 29 at 180° spacing from one another. Thus these partitions form one fluid channel 32a into which fluid is discharged via port 55, and another vertical fluid channel 32b which is closed off from channel 32a. The lower end of the latter channel communicates via port 59 in the lower end of sleeve 30 with the space inside pipe 35, and is received by passages 60 in coupling 51 and conveyed to longitudinal fluid passageways 61 extending downwardly through the successive drill collars to the fluid passage 62 in the bit, to be discharged finally from the lower end of the bit through discharge ports as indicated.

Cylinder 27 is formed, immediately below partition 46, with a multiplicity of equally spaced fluid ports 65, and is also formed, just above bottom wall 45, with a similar multiplicity of equally spaced fluid ports 66, there being twenty of the ports 65 and twenty of the ports 66 in the illustrative embodiment. The ports 66 are spaced from one another the same as the ports 65, but are shifted circumferentially by half the distance between ports as compared with the position of the ports 65, as may readily be seen from a comparison of Figs. 4 and 5. Sleeve 30 is provided, at the level of ports 65, with two sets of equally spaced ports, a set of ports 67a opening into fluid channel 32a, and a set of ports 67b opening into fluid channel 32b. There are, in the present embodiment, nine of the ports 67a, arranged consecutively, and at the same angular spacing as the ports 65, in this instance 18°. Similarly, there are nine of the ports 67b, arranged consecutively, and at the same spacing as the ports 66, in this instance 18°. It will be seen by reference to Fig. 4 that the ports 67a occupy approximately the half of the sleeve 30 to one side of the partitions 58, and the ports 67b occupy the other half of sleeve 30, on the other side of the partitions 58, and that the spacing distance between the end ports 67a and 67b is equal to one and one-half times the spacing distance of the ports 65. In other words, the spacing distance between the end ports 67a is, in the present instance, equal to approximately 27°. This means that in the rotation of the cylinder 27 within sleeve 30 all of the ports 65 on one side of the partitions 58 will, in the position of Fig. 4, register with all of the ports 67a, while all of the ports 65 on the opposite side of the partitions 58 will be out of register with the ports 67b. For a position advanced 9° from the position of Fig. 4, the first group of ports 65 will be out of register with the ports 67a, while the second group of ports 65 will then be in register with the ports 67b. Accordingly, in the position illustrated in Fig. 4, fluid will pass from the channel 32a into the cylinder space above piston 48, and in the subsequent position, advanced 9° from the position of Fig. 4, this fluid will be enabled to discharge through registered ports into the channel space 32b.

Sleeve 30 is also provided, at the level of cylinder port 66, with two series of ports 68b, relatively spaced in a circumferential direction exactly as the ports 67a and 67b hereinabove described. It will be recalled that the ports 66 are shifted circumferentially with reference to ports 65 by half the distance between successive ports, or in other words by 9°. Accordingly, in the position of the apparatus shown in Figs. 4 and 5, the ports 66 on one side of the partitions 58 are registered with the ports 68b, with the result that fluid in cylinder 27 below piston 48 is at such time able to discharge into channel 32b. When the cylinder 27 is advanced 9° from the position of Figs. 4 and 5, registration will be effected between ports 68a and ports 66, permitting fluid in channel 32a to enter cylinder 27 below the piston, and the remaining ports 66 will be cut off from registration with discharge ports 68b.

It will now be seen that, in the position of the cylinder 27 shown in Figs. 4 and 5, the mud fluid circulated down through the pipe string, and always present in the channel 32a, flows in through registered ports 67a and 65 to the cylinder space above the piston, forcing the piston downward. At the same time, the cylinder space below the piston is open to discharge channel 32b via registered ports 66 and 68b. Nine degrees of rotation of cylinder 27 later, the fluid intake into the upper end of cylinder 27 is closed off, and fluid enters the lower end of the cylinder through registered ports 68a and 65, while fluid in the upper end of the cylinder discharges to channel 32a by way of the registered ports 65 and 67b. It will be seen that the fluid thus flows from intake channel 32a to discharge channel 32b, alternately through the upper end portion of cylinder and the lower end portion thereof, alternately exerting downward and upward forces on piston 48, which are transmitted through connecting rod 49 to the upper end of the drill rod made up of the coupled collars 14—17. The vibration generator will be seen to be, in effect, a fluid motor with a vibratory piston and force delivering connecting rod, which is coupled to the drill collar rod.

A vibratory force, of frequency governed by the speed of rotation of the drill string 20 by the rotary table at the ground surface, is thus applied by this vibration generator to the upper end of the drill rod 13. It will be seen that to enable the piston 48 to exert this force on the drill rod, the pressure cylinder 27 must be connected with the drill rod, and this connection is made by way of the pipe 35 extending downwardly from the body 28 of the generator housing and welded to the rod 13, in this instance to the lower end portion of the upper collar 14.

The fluid is pumped down through the drill string and through the apparatus with sufficient velocity to generate the described vibratory force at a resonant frequency of the column or rod made up of the collars 14—17, and for the simple case of fundamental resonant frequency, this frequency will be approximately equal to $S/2L$, or between $S/4L$ and $S/2L$, where $S$ is the speed of sound in the material of the drill collars, and $L$ is the length of the rod made up of said collars. Under such circumstances, a resonant longitudinal elastic vibration of the drill collar rod is established, the two end portions thereof moving in a longitudinal direction, oppositely to one another, and the center section standing substantially stationary. The bit on the lower end of the drill collar rod is accordingly vibrated in engagement with the formation, which gives way, apparently by elastic fatigue failure. In the present instance, the valve ports are designed to open and close twenty times per revolution of the cylinder 27, and assuming a speed of rotation of 180 R. P. M., there will be 3,600 valve actuations per minute. In other words, the piston 48 will be oscillated at a frequency of 3,600 cycles per minute, or 60 cycles per second. For this frequency, a steel drill collar rod 13 of approximately 140 feet in length will resonate at its fundamental resonate frequency for longitudinal elastic vibration.

While with the drill as described, no provision has been made in connection with the vibration generator for adjusting the relatively low impedance of the motive power source to the relatively high impedance of the formation to be drilled, the drill is nevertheless capable of effective drilling, particularly under favorable conditions, by reason of the large cross-sectional area drill collar rod provided by the invention. The shear moving inertia of this very massive, large diameter drill collar holds the drill vibration at a large stroke value against the formation, and maintains the large displacement amplitude at the generator. Thus, by reason of the large cross-section of the drill collar, I have accomplished a sufficient degree of impedance match between the desirably active generator and the formation to enable the apparatus to drill to good effect. It will be seen that in this case, the heavy drill collar rod itself couples effectively as an intermediate link to the formation, and with the degree of coupling so obtained, the degree of force application from the vibration generator to the rod obtainable from such a simple generator as described hereinabove is sufficient for operation.

Drilling is, however, much more effective by making an impedance adjustment between the motive power source and the elastic drill rod. The power available in the mud fluid pumped down the drill string is in a low impedance form, the volume flow being relatively great and the pressure being relatively low. The basic need at the bit, on the other hand, is for high impedance power, i. e., relatively high pressure and relatively low velocity. To approach this end, the vibration generator should have a low impedance fluid motor component characterized by a large displacement rate. It should be capable of handling the large volume flow of the mud stream, and at the same time, it should deliver power characterized by low displacement rate. At the bit, this means small displacement amplitude (low velocity), but great force application. In an improved form of vibration generator, I accordingly incorporate an impedance adjusting transformer characteristic, by which the drill is enabled to receive its motive power at low impedance, but to deliver its power output to the formation at high impedance. I accomplish such an impedance adjustment in the modified drill of Fig. 6 by dividing the fluid flow through the multiple piston fluid motor of the vibration generator into multiple, parallel flow paths, permitting increased volume flow, and bringing about multiplied displacement rate. This high displacement rate in the fluid motor is then converted by the simple piston linkage of the generator to low displacement rate, i. e., high force and low displacement amplitude, at the point of driving connection with the vibratory rod.

Fig. 6, taken together with Figs. 3-5, shows a drill exactly like that of Fig. 2, but with multiple, parallel flow paths through the fluid motor of the vibration generator. A repetition of the description of the entire drill in this form would be superfluous, and the description of the embodiment of Fig. 2 will serve also for the modification of Fig. 6. Also, for convenience, corresponding parts of the two drills are identified by similar reference numerals.

It will be seen that in the embodiment of Fig. 6, the vibration generator is further elongated, and furnished with a multiplicity of the piston chambers for a corresponding multiplicity of pistons 48 mounted in spaced relation on connecting rod 49. The multiple valve-controlled fluid passages through these piston chambers will be seen to be in parallel with one another, and the fluid motor is hence capable of accepting a multiplied fluid flow volume. The displacement rate capability of the fluid motor of the embodiment of Fig. 6 is accordingly a number of times that of the embodiment of Fig. 2. The total pressures exerted on the multiple pistons 48 are of course cumulative, and I accordingly accomplish a commensurate gain in total force application to the drill collar rod. While the displacement rate within the fluid motor is high, the displacement amplitude at the point of force application to the drill collar rod is small. The device accordingly functions as an impedance adjusting transformer, converting the low impedance power of the fluid stream, flowing with high displacement rate through the fluid motor, into high impedance power at the coupling with the vibratory drill collar rod.

This impedance adjusting vibration generator, employed in combination with the large cross-sectional area drill collar rod of the invention, provides an idealized sonic drilling system, the vibration generator and the drill collar both functioning to adjust the low impedance motive power source toward the high impedance formation. Even with a drill collar of smaller cross-sectional area than that here indicated as desirable, however, the impedance adjusting vibration generator of Fig. 6, by reason of its force gaining property, accomplishes a sufficient impedance adjustment to enable effective drilling.

Figs. 7-9 show a modified drill making use of my heavy drill collar in combination with a magneto-strictive type of vibration generator for accomplishing effective drilling without use of special impedance adjustment provisions, such as velocity reduction, between the generator and the elastic collar. The drill of Figs. 7-9 is shown illustratively as a cable tool type of sonic percussion drill. It will be evident that mud fluid circulation can be readily provided, if desired. Suggestions for provision of mud fluid circulation in connection with a cable-suspended sonic drill are given in my aforesaid Patent No. 2,554,005.

Numeral 80 designates the massive, elastic, longitudinally vibratory rod in its entirety, made up, in this case, of drill collar 81 and magnetostriction generator 82. To the lower end of collar 81 is coupled a bit 83, here illustratively shown as having blades 83a. The collar 81 is such a heavy collar as described in connection with Figs. 1 and 1a. That is to say, it has an average cross-sectional area at least equal to that of a cylindrical rod whose diameter is equal to one-half the diameter of the bit circle, i. e., to the circle defined by the blades 83a of the bit.

The generator 82 comprises, illustratively, a laminated steel core 85 having two parallel legs 86, and upper and lower ends 87 and 88, respectively, connecting said legs, together with windings 89 on legs 86. The total cross-sectional area of the legs 86, in all cases in which the magnetostrictive generator forms any substantial or significant portion of the elastic rod 80, is to conform to the minimum cross-sectional specification given immediately above for the collar 81.

The lower end of the core 85 is furnace-welded to a sub at the upper end of the drill collar 81, and the upper end of the core is equipped with a stirrup 90 by which the apparatus is supported from cable 91. The latter is made up of outer steel strands 92, an insulation tube 93, and a stranded copper conductor 94 inside tube 93. The lower end of this conductor is connected as shown to one of the windings 89, and the other winding is grounded, as indicated at 95. The two windings may be series connected, and so wound that the magnetic circuit is continuous around the core.

The windings are energized from a suitable generator at the ground surface, operating typically at 440 volts single phase and 200 cycles per second. The frequency range may be either above or below 200 cycles, and one of the advantages of the system is the fact that there are no mechanically imposed upper limitations on frequency. Using higher frequencies, the rod 80 becomes shortened, in accordance with laws hereinabove set forth.

The alternating magnetization of the legs 86 causes them alternately to elongate and contract; and the force so exerted on the collar 81 causes a corresponding alternate elongation and contraction of the entire elastic rod structure 80. Assuming use of an alternating current of frequency proper to set up the alternate elongations and contractions of the legs 86 at a resonant frequency of the rod structure 80, a half-wave type of longitudinal standing wave vibration is established with the two end portions of the rod 80 moving substantially equally and oppositely with respect to one another, while the center portion of the rod stands substantially stationary. In other words, the half-wave length standing wave extends throughout both the collar 81 and the generator legs 86, i. e., throughout the length of the rod 80. Modified forms of the drill may have the generator legs occupy a relatively large or relatively short proportion of the total rod length. At the maximum, the entire rod 80 may be made up of the magneto-striction legs; at the minimum, the magneto-striction legs may occupy only an insignificant fraction of the total rod length. As stated heretofore, in all cases wherein the magneto-striction legs comprise any significant part of the rod 80, they conform to the minimum cross-sectional specification above given for the collar 81. Using such a heavy rod, drilling effectiveness is satisfactory for many applications notwithstanding the lack of an impedance adjusting device, for reasons given heretofore. It is to be noted in this connection, however, that the high impedance of the large sized elastic vibratory rod improves the coupling between the earthen formation and the alternating current generator located at the ground surface.

It will be understood that the drawings and descriptions are for illustrative purposes only and that various changes in design, structure and arrangement may be made without departing from the spirit and scope of the invention as defined in the appended claims.

I claim:
1. Apparatus for drilling a bore hole in the earth having in combination: a bit for applying drilling action on the bottom of said bore hole, an elongated massive rod drivingly coupled to the top of said bit, said rod having a diameter less than that of the bit and an average cross-sectional area no less than that of a solid cylindrical rod whose diameter is one-half the diameter of said bit, and an elastic vibration generator attached to said rod, said generator being operable to apply cyclic longitudinal vibration forces to said rod at the frequency of a longitudinal resonant elastic vibration of said rod, whereby the bit will be vibrated by cyclic motion of the end of said massive rod in response to cyclic elastic strains in the large area cross section thereof.

2. Apparatus according to claim 1, wherein said elastic vibration generator comprises a housing connected to said rod at a point substantially spaced from the upper end of the latter, a cylindrical chamber in said housing, a working cylinder rotatably mounted in said chamber, a piston in said working cylinder, a connecting rod interconnecting said piston with the upper end of said massive rod, connector means connected to said working cylinder for coupling said cylinder to a rotatable drill pipe string in the bore hole, said connector means having a fluid passage for a stream of drilling fluid received through the drill pipe string, and valve means controlled by the rotation of said working cylinder for alternately admitting and exhausting the drilling fluid to and from said working cylinder.

3. Apparatus according to claim 1, wherein said elastic vibration generator comprises a housing connected to said rod at a point substantially spaced from the upper end of the latter, a cylindrical chamber in said housing, a working cylinder assembly rotatably mounted in said chamber, said assembly having a plurality of piston chambers, a corresponding plurality of pistons in said piston chambers, a connecting rod interconnecting said pistons with one another and with the upper end of said massive rod, connector means connected to said working cylinder for coupling said cylinder to a rotatable drill pipe string in the bore hole, said connector means having a fluid passage for a stream of drilling fluid received through the drill pipe string, and fluid passage and valve means controlled by the rotation of said working cylinder for alternately admitting and exhausting drilling fluid to and from said fluid passage in parallel paths through corresponding end portions of said piston chambers.

4. Apparatus for drilling a bore hole in the earth having in combination: a bit for applying drilling action on the bottom of said bore hole, an elongated massive rod drivingly coupled to the top of said bit, an elastic vibration generator attached to said rod, said generator being operable to apply cyclic longitudinal vibration forces to said rod at the frequency of a longitudinal resonant elastic vibration frequency of said rod, said generator comprising a housing connected to said rod at a point substantially spaced from the upper end of the latter, a cylindrical chamber in said housing, a working cylinder rotatably mounted in said chamber, a piston in said working cylinder, a connecting rod interconnecting said piston with the upper end of said massive rod, connector means connected to said working cylinder for coupling said cylinder to a rotatable drill pipe string in the bore hole, said connector means having a fluid passage for a stream of drilling fluid received through the drill pipe string, and valve means controlled by the rotation of said working cylinder for alternately admitting and exhausting the drilling fluid to and from said working cylinder.

5. Apparatus for drilling a bore in the earth, having in combination: a bit for applying vibratory action to the bottom of the bore hole, a massive elongated elastic rod connected to the top of said bit, and an elastic vibration generator for applying vibration forces to said rod at a longitudinal resonant elastic vibration frequency of said rod, said generator including a housing and a vertically oscillative member contained in said housing and reactively coupled thereto, one of which is connected to the upper end portion of said elastic rod and the other of which is connected to a point on said rod spaced substantially down from the upper end of said rod, said generator also including motor means for driving said oscillative member including a power receiving member receiving motive power down said bore hole for actuation from the earth's surface.

6. Apparatus for drilling a bore in the earth, having in combination: a bit for applying vibratory action to the bottom of the bore hole, a massive elongated elastic rod connected to the top of said bit, and an elastic vibration generator for applying vibration forces to said rod at a longitudinal resonant elastic vibration frequency of said rod, said generator including a longitudinal working cylinder having a plurality of longitudinally spaced piston chambers, a connecting rod interconnecting said pistons with one another, said cylinder assembly and said piston rod being drivingly connected one to the upper end of said massive elongated rod and the other to a point on said rod spaced substantially down from the upper end of said rod, fluid conduit means connectible to a drill pipe string for supplying drilling fluid to the piston chambers to move said pistons therein, and valve means for admitting and then discharging fluid flow into and from corresponding end portions of said plurality of piston chambers at said resonant frequency of said massive rod.

ALBERT G. BODINE, Jr.

References Cited in the file of this patent
UNITED STATES PATENTS

| Number | Name | Date |
|---|---|---|
| 1,966,446 | Hayes | July 17, 1934 |
| 2,554,005 | Bodine | May 22, 1951 |
| 2,632,858 | Calosi | Mar. 24, 1953 |